C. M. PALMER.
ANIMAL SHEARS.
APPLICATION FILED OCT. 27, 1917.
1,282,459.
Patented Oct. 22, 1918.
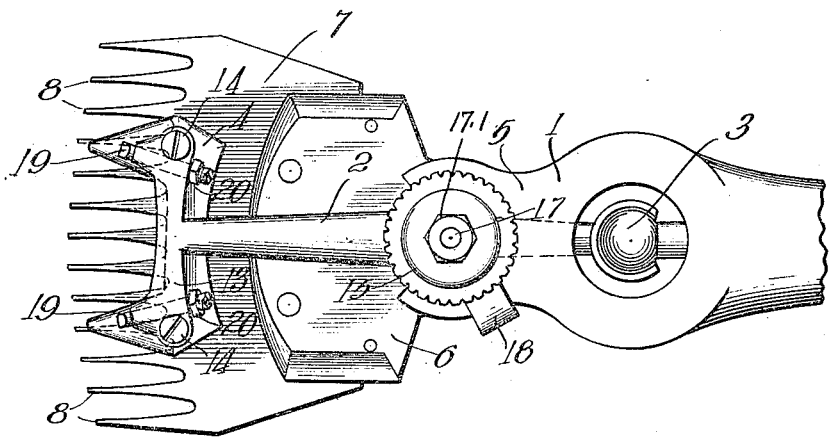
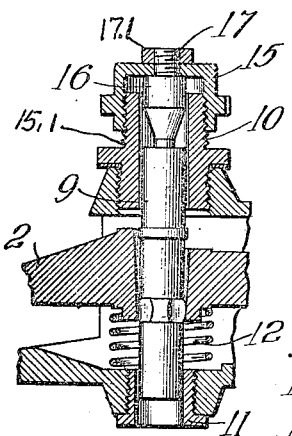
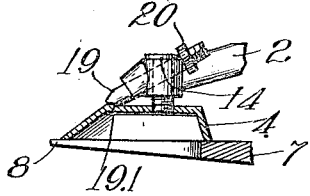
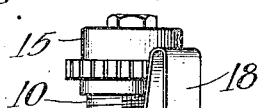
Witnesses:
Harry R. Lewhite
W. E. Anderson
Inventor:
Chester M. Palmer
By Rummler & Rummler
Attys

UNITED STATES PATENT OFFICE.

CHESTER M. PALMER, OF AURORA, ILLINOIS.

ANIMAL-SHEARS.

1,282,459.

Specification of Letters Patent.

Patented Oct. 22, 1918.

Application filed October 27, 1917. Serial No. 198,799.

*To all whom it may concern:*

Be it known that I, CHESTER MOSES PALMER, a citizen of the United States of America, and a resident of Aurora, county of Kane, and State of Illinois, have invented certain new and useful Improvements in Animal-Shears, of which the following is a specification.

This invention relates to animal shears of the type wherein a cutter is carried by an arm journaled intermediate its ends, and connected to mechanism whereby it is oscillated so as to move said cutter back and forth across the toothed end of the supporting member.

The main object of this invention is to provide improved adjustable means for tensioning said cutter on said toothed member.

In the drawings—

Figure 1 is a plan of a pair of shears of the type above mentioned having the improved tensioning means applied thereto.

Fig. 2 is a side view of the same.

Fig. 3 is a vertical section of the mounting of the oscillating lever on the frame and showing the improved means for adjusting said lever relative to the frame.

Fig. 4 is a side view, partly sectional, of the cutting parts of said shears.

In the device showing in the drawings, the herein described improvements are embodied in animal shears of the type covered by U. S. Patent No. 931,141, issued to me on August 17, 1909.

The animal shears to which this improved tensioning means are applied comprise a frame 1 upon which is journaled an arm or lever 2 connected to a cam mechanism 3 whereby said lever is oscillated so as to move a cutter 4 back and forth across the forward end of the member 1 which member consists of a toothed plate formed so as to serve as a fixed cutter or comb.

The frame 1 comprises a housing 5 within which the lever 3 is journaled and having a flange 6 formed at the forward end thereof to which is secured a fixed cutter in the form of a flat metal plate 7 provided with a row of teeth 8. The teeth 8 are shaped so as to coact with the cutter 4 for shearing the wool or hair from animals.

The oscillating lever is in the form of a horizontally disposed bar pivoted medially of its ends in the housing 5. A shaft 9 is fixed to the lever 3 and has the ends thereof journaled in bearings 10 and 11 on the housing 5. A spring 12 embraces the shaft 9 and provides a yielding support for the lever 3. The forward end of the lever is in the form of a fork 13 which engages the cutter 4 and actuates the same. Stud screws 14 are carried by the fork 13 and have their ends extending into apertures formed in the cutter 4 by reason of which the cutter 4 is carried with the lever 2 back and forth across the teeth 8 on the plate 7.

Tensioning means are provided for regulating the pressure of the cutter 4 on the toothed plate 7. One of these means is arranged for adjusting the lever vertically, and the other is for adjusting the point of application of the pressure of said lever upon the cutter.

The lever adjusting means comprises a cap 15 having threaded engagement with a tubular extension 15.1 on the frame 1 and having an inwardly disposed stem 16 adapted to bear upon the upper end of the shaft 9. The turning of the cap 15 shifts the shaft 9 and through the coaction of the spring 12, varies the pressure of the cutter 4 on the plate 7. The stem 16 is provided with a threaded shank 17 which extends through an aperture on the cap 15 and is secured thereto by a nut 17.1. This allows the stem 16 to be more conveniently arranged on the cap than would be the case if the stem were integral.

The cap 15 has a rim formed thereon which is notched and against which a spring 18 bears for the purpose of yieldingly holding the cap in its set position.

The other adjusting means comprises pins 19 mounted in the ends of the fork 13 and having threaded engagement therewith whereby they may be longitudinally adjustable. The pins are inclined at an angle to the plate and the forward ends bear upon the cutter 4 in advance of the connection of the cutter to the fork, viz., the screws 14. The forward ends of the pins 19 are flattened as at 19.1 so as to afford a firmer bearing of the pins on the cutter and also lessen the liability of the pins becoming loosened during the operation of the device. By turning the pins 19, the effective length of the fork is adjusted so as to vary the point at which the pressure is applied to the cutter. Lock-nuts 20 are provided at the rear ends of said pins so as to prevent said pins from working loose after having been correctly adjusted.

The adjustment of the pressure on the cutters is obtained by the turning of the cap 15. The cutters are moved out of close contact by turning the cap 15 so as to allow the spring 12 to urge the lever away from the base of the housing 5. The opposite turning of the cap 15 forces the lever 3 against the spring 12 so that the cutter 4 is brought into close contact with the plate 7. This adjustment may be made while the machine is at rest or while it is running.

The adjustment of the point of application of pressure to the cutter is made by turning the pins 19 as above described, and in order to provide for an adjustment as small as is represented by a single half turn of said screws, the same are provided with two flattened surfaces 19.1 as shown in the drawings. The importance of this adjustment will be appreciated when it is understood that the cutting edges of the cutter 4 are flattened by grinding the lower faces thereof. These edges all lie in the same plane, but in grinding them, more metal is sometimes ground off at the front than at the back, or vice versa, and when such inaccurate grinding occurs, it is necessary to change the point of application of the pressure of the fork upon the cutter, in order that the cutter will snugly fit the face of the comb for proper shearing action. This adjustment need of course be made only at the time of initially assembling the device and at times when the cutter is reground.

Although but one specific embodiment of this invention has been herein shown and described, it will be understood that numerous details of the construction shown may be altered or omitted without departing from the spirit of this invention as defined by the following claims.

I claim:

1. Animal shears comprising a frame, a fixed cutter on said frame, an oscillating lever mounted on said frame, a movable cutter mounted on said lever so as to be moved therewith relative to said fixed cutter, a shaft rigid with said lever and journaled on said frame so as to be longitudinally shiftable, a spring interposed between said frame and lever for yieldingly supporting said lever, an internally threaded cap on said frame having threaded engagement therewith, an inwardly protruding pin on said cap bearing upon said shaft, said cap being adapted to be actuated so as to shift said lever relatively of said frame for regulating the pressure of said movable cutter on said fixed cutter, and pins mounted on said lever at an angle to said cutter and having their points of contact forwardly of the connection of said movable cutter to said lever, said pins and said cap being adapted to be turned so as to adjust said movable cutter and regulate the pressure thereof on said fixed cutter.

2. Animal shears comprising a frame, a fixed cutter on said frame, an oscillating lever mounted on said frame, a movable cutter adjustably mounted on said lever and adapted to move therewith relative to said fixed cutter, and pins mounted on said lever and inclined to said fixed cutter with their axes in radial alinement with the axis of said lever, each of said pins having its outer end engaging said movable cutter at a point in advance of the connection of said movable cutter to said lever, and in approximate alinement with the axis of said pin, said pins being adapted to be turned so as to adjust the pressure on said movable cutter relatively of said lever and thereby regulate the pressure of said movable cutter on said fixed cutter.

3. Animal shears comprising a frame, a fixed cutter on said frame, an oscillating lever mounted on said frame, a movable cutter adjustably mounted on said lever and adapted to move therewith relative to said fixed cutter, and pins mounted on said lever and inclined to said fixed cutter with their axes in radial alinement with the axis of said lever, each of said pins having its outer end engaging said movable cutter at a point in advance of the connection of said movable cutter to said lever, and in approximate alinement with the axis of said pin, said pins having their bearing ends flattened and being adapted to be turned so as to adjust said movable cutter relatively of said lever and thereby regulate the pressure of said movable cutter on said fixed cutter.

4. Animal shears comprising a frame, a fixed cutter on said frame, an oscillating lever mounted on said frame, a movable cutter adjustably mounted on said lever and adapted to move therewith relative to said fixed cutter, pins mounted on said lever and inclined to said fixed cutter with their axes in radial alinement with the axis of said lever, each of said pins having its outer end engaging said movable cutter at a point in advance of the connection of said movable cutter to said lever, and in approximate alinement with the axis of said pin, said pins having their bearing ends flattened and being adapted to be turned so as to adjust said movable cutter relatively of said lever and thereby regulate the pressure of said movable cutter on said fixed cutter, and means on said pins for locking the same against shifting after having been set.

Signed at Chicago this 22nd day of Oct., 1917.

CHESTER M. PALMER.